US006298166B1

(12) United States Patent
Ratnakar et al.

(10) Patent No.: US 6,298,166 B1
(45) Date of Patent: *Oct. 2, 2001

(54) IMAGE TRANSFORMATIONS IN THE COMPRESSED DOMAIN

(75) Inventors: Viresh Ratnakar, Sunnyvale; Victor Ivashin, Danville; Vasudev Bhaskaran, Mountain View, all of CA (US)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,039

(22) Filed: Mar. 30, 1998

(51) Int. Cl.$^7$ .................................................. G06K 9/36
(52) U.S. Cl. ............................. 382/248; 382/235
(58) Field of Search ........................... 382/232, 233, 382/234, 235, 236, 237, 238, 239, 240, 241, 242, 243, 244, 245, 246, 248, 276, 295–297; 348/207; 358/133, 432; 708/203, 400

(56) References Cited

U.S. PATENT DOCUMENTS

| | | | |
|---|---|---|---|
| 4,658,430 | * 4/1987 | Anderson et al. | 382/235 |
| 4,837,845 | * 6/1989 | Pruett et al. | 382/235 |
| 5,001,559 | * 3/1991 | Gonzales et al. | 358/133 |
| 5,065,446 | * 11/1991 | Suzuki et al. | 382/245 |
| 5,129,015 | * 7/1992 | Allen et al. | 382/245 |

(List continued on next page.)

FOREIGN PATENT DOCUMENTS

| 0 278 175 | 8/1988 | (EP) . |
|---|---|---|
| WO 96/36941 | 11/1996 | (WO) . |

OTHER PUBLICATIONS

Smith, et al. "Algorithms For Manipulating Compressed Images", IEEE Computer Graphics & Applications, pp 34–42, Sep. 1993.

IEEE Journal on Selected Areas in Communication, vol. 13, No. 1, pp. 1–11, Jan. 1995, Manipulation and Compositing of MC–DCT Compressed Video, S.F. Chang and D. G. Messerschmitt.

Proc. ICASSP '96, pp. IV. 2307–2310, Atlanta, May 1996, A Fast Algorithm for DCT–Domain Inverse Motion Compensation, Neri Merhav and Vasudev Bhaskaran.

IEEE International Conference on Image Processing (ICIP), Washington, D.C., Oct. 1995, A Fast Approximate Algorithum For Scaling Down Digital Images In the DCT Domain, Balas K. Natarajan and Vasudev Bhaskaran.

IEEE Computer Graphics and Applications, pp. 34–42, Sep. 1993, A New Family of Algorithums for Manipulating Compressed Images, Brain C. Smith and Lawrence A. Rowe.

(List continued on next page.)

*Primary Examiner*—Phouc Tran
*Assistant Examiner*—Amir Alavi (57) ABSTRACT

Image processing techniques which involve direct manipulation of the compressed domain representation of an image to achieve the desired spatial domain processing without having to go through a complete decompression and compression process. The techniques include processing approaches for performing the eight operations in $D_4$ (the dihedral group of symmetries of a square) on JPEG images using the discrete cosine transform (DCT) domain representation of the images directly. For a task such as image rotation by 90° (an operation in $D_4$), DCT-domain based methods can yield nearly a five-fold increase in speed over a spatial-domain based technique. These simple compressed-domain based processing techniques are well suited to the imaging tasks that are needed in a JPEG-based digital still-camera system.

36 Claims, 4 Drawing Sheets

U.S. PATENT DOCUMENTS

| | | | | |
|---|---|---|---|---|
| 5,142,380 | * | 8/1992 | Sakagami et al. | 358/432 |
| 5,189,526 | * | 2/1993 | Sasson | 358/432 |
| 5,319,724 | * | 6/1994 | Blonstein et al. | 382/246 |
| 5,416,615 | * | 5/1995 | Shirota | 358/530 |
| 5,539,468 | | 7/1996 | Suzuki et al. | |
| 5,563,718 | | 10/1996 | Wober et al. | |
| 5,581,635 | * | 12/1996 | Zhu et al. | 382/245 |
| 5,611,001 | * | 3/1997 | Kadakia et al. | 382/297 |
| 5,677,689 | | 10/1997 | Yovanof. | |
| 5,680,129 | | 10/1997 | Weinberger et al. | |
| 5,682,152 | | 10/1997 | Wang et al. | |
| 5,706,216 | | 1/1998 | Reisch. | |
| 5,751,865 | | 5/1998 | Micco et al. | |
| 5,821,994 | * | 10/1998 | Tani | 348/207 |
| 5,867,598 | * | 2/1999 | de Queiroz | 382/235 |
| 5,991,450 | * | 11/1999 | Ohsawa et al. | 382/245 |

OTHER PUBLICATIONS

Communications of the ACM, vol. 34, No. 4, Apr. 1991, The JPEG Still Picture Compression Standard, Gregory K. Wallace.

The Transactions of the IEICE, vol. E 71., No. 11, pp. 1095–1097, Nov. 1988, A Fast DCT-SQ Scheme For Images Yukihiro Arai, Takeshi Agui and Masayuki Nakajima.

Elsevier Science Publishers B.V., Signal Processing–19 (1990) pp. 233–245, Discrete Cosine Transform Filtering, B. Chitprasert and K.R. Rao.

* cited by examiner

IMAGE TRANSFORMATIONS IN THE COMPRESSED DOMAIN

BACKGROUND OF THE INVENTION

1. Field of the Invention

This invention relates generally to the processing of the compressed domain representation of image data, and more particularly to the manipulation of the compressed domain representation to achieve certain spatial domain processing, such as regular geometric transformations of an image, without having to subject the image data to the full decompression and compression process.

2. Description of the Related Art

A typical high quality digitized color image may use 24 bits per pixel (bpp)—8 bits each for red (R), green (G) and blue (B) in RGB color space or for luminance (Y), chrominance ($C_B$) and chrominance ($C_R$) in $YC_BC_R$ color space. To transmit or store such images in the uncompressed state (i.e., in spatial or pixel domain) is simply too costly in terms of time and memory requirements. Thus, applications and devices which store and/or transmit high quality digitized color images, such as digital cameras, typically do so in a compressed format, using one of the currently available compression algorithms.

The emergence of compression standards such as JPEG (an acronym for "Joint Photographic Experts Group") has led to many digital imaging systems and applications that create and maintain content only in JPEG compressed format. For instance, in most digital still-imaging cameras (DSCs) such as the Epson PhotoPC 600, Kodak DC-10, etc., pictures captured by the camera are immediately compressed within the camera and stored in the camera's storage system as JPEG files. Often there is a need to manipulate these pictures prior to display. Typical image manipulations might include (a) rotating the picture from portrait to landscape mode and vice-versa, (b) scaling the picture to increase or decrease its size, (c) changing brightness and contrast in the picture, (d) cropping portions of the picture for the purposes of creating a new picture and for compositing operations, (e) adding simple bitmap annotations to a picture, and (f) embedding visible/invisible watermarks in the picture. Due to storage constraints within the digital camera, these image manipulations require the processed output to be in JPEG format.

The need to do these tasks and the availability of the picture only in the compressed mode has resulted in a great deal of interest in developing image processing techniques that can be applied directly to the compressed domain representation. The motivation for investigating compressed domain processing methods stems from the observations that (a) the volume of data in compressed domain tends to be quite small compared to the spatial domain representation which means that fewer operations per sample may be required for the desired image processing task, and (b) conventional processing pipelines that require the data to be decompressed, followed by the application of the desired image processing function in spatial domain, and then recompressed for transmission or storage efficiency can lead to a loss in image fidelity. Furthermore, such a conventional processing pipeline has very high computation complexity or high latency since the compression task is often more complex than the decompression task. The compressed-domain based processing methodology on the other hand, often leads to reduced computation complexity since it replaces the JPEG decompression and compression tasks by low complexity tasks such as Huffman decoding and Huffman encoding. (See, S. F. Chang and D. G. Messerschmitt, "Manipulation and Compositing of MC-DCT Compressed Video," *IEEE JSAC Special Issue on Intelligent Sigital Processing*, vol. 13, no. 1, pp. 1–11, January 1995; N. Merhav and V. Bhaskaran, "A fast algorithm for DCT-domain inverse motion compensation," *Proc. ICASSP '96*, pp. IV.2307–2310, Atlanta, May 1996; B. Natarajan and V. Bhaskaran, "A fast approximate algorithm for scaling down digital images in the DCT domain," *IEEE International Conference on Image Processing (ICIP)*, Washington, D.C., October 1995; and Brian Smith and Larry Rowe, "Algorithms for manipulating compressed images," *IEEE Computer Graphics and Applications*, pp. 34–42, September 1993.)

OBJECTS OF THE INVENTION

Therefore, it is an object of the present invention to overcome the aforementioned problems associated with performing manipulations on digital images in spatial domain.

It is another object of this invention to provide for direct manipulation of the compressed domain representation of an image to bring about a selected spatial domain manipulation without having to go through a complete decompression and compression process.

It is a further object of this invention to provide a set of algorithms which greatly simplify the compressed data manipulations required to bring about the corresponding image manipulations in the spatial domain.

It is still another object of this invention to provide a set of algorithms to manipulate image data in the compressed domain that includes a manipulation step which takes one set of compressed data and produces another set of compressed data, such that, if the process was reversed, the original image could be produced without any loss of quality.

SUMMARY OF THE INVENTION

The present invention provides a technique for performing various dihedral symmetry operations on a spatial domain representation of a digital image by manipulating a linear transform domain representation of the digital image. When a digital image is in the form of a compressed bitstream, such as a JPEG file, the technique involves entropy decoding the compressed bitstream to generate linear-transform-based data blocks which define the linear transform domain representation of the digital image. The linear-transform-based data blocks are reordered for the corresponding geometric transformation, a particular linear transform domain operation is applied to the data elements within each block, and the blocks are reassembled. When these blocks of data are decompressed into spatial domain, the resulting digital image will be flipped or rotated with respect to the original image. With respect to the original image, the resulting image may be flipped over either diagonal (main or cross-), flipped over either of its middle axes (vertical or horizontal), or rotated 90°, 180° or 270°. The technique may be applied in an imaging device, such as a digital still-image camera, or in a computer system. In either case, the technique may be implemented using hardware or software.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Since the 8×8 discrete cosine transform (DCT) is chosen as the basis function in still-image compression standards such as JPEG (see, G. K. Wallace, "The JPEG Still Picture Compression Standard," *Communications of the ACM*, vol. 34, no. 4, April 1991), and since JPEG is the compression method widely used in many consumer digital still-cameras in the market, the following description will focus on some of the compressed-domain processing methods that are appropriate for digital still-camera applications and that operate on the DCT domain representations of the camera's JPEG compressed bitstream. Although 8×8 is the most common DCT block size, these techniques may be extended to other DCT block sizes. Furthermore, the techniques are extensible to any other linear transform based basis functions including discrete sine transform, discrete hadamard transform and also the wavelet transforms.

We begin by briefly describing the JPEG compression and decompression processes and the basic idea of incorporating image processing functions within the JPEG pipeline. JPEG uses the DCT to transform still-image data from its spatial or pixel domain representation to its compressed or frequency domain representation in which the data can be more efficiently coded. The image manipulation methods developed herein are designed to take advantage of the properties of the DCT.

Figure 1:
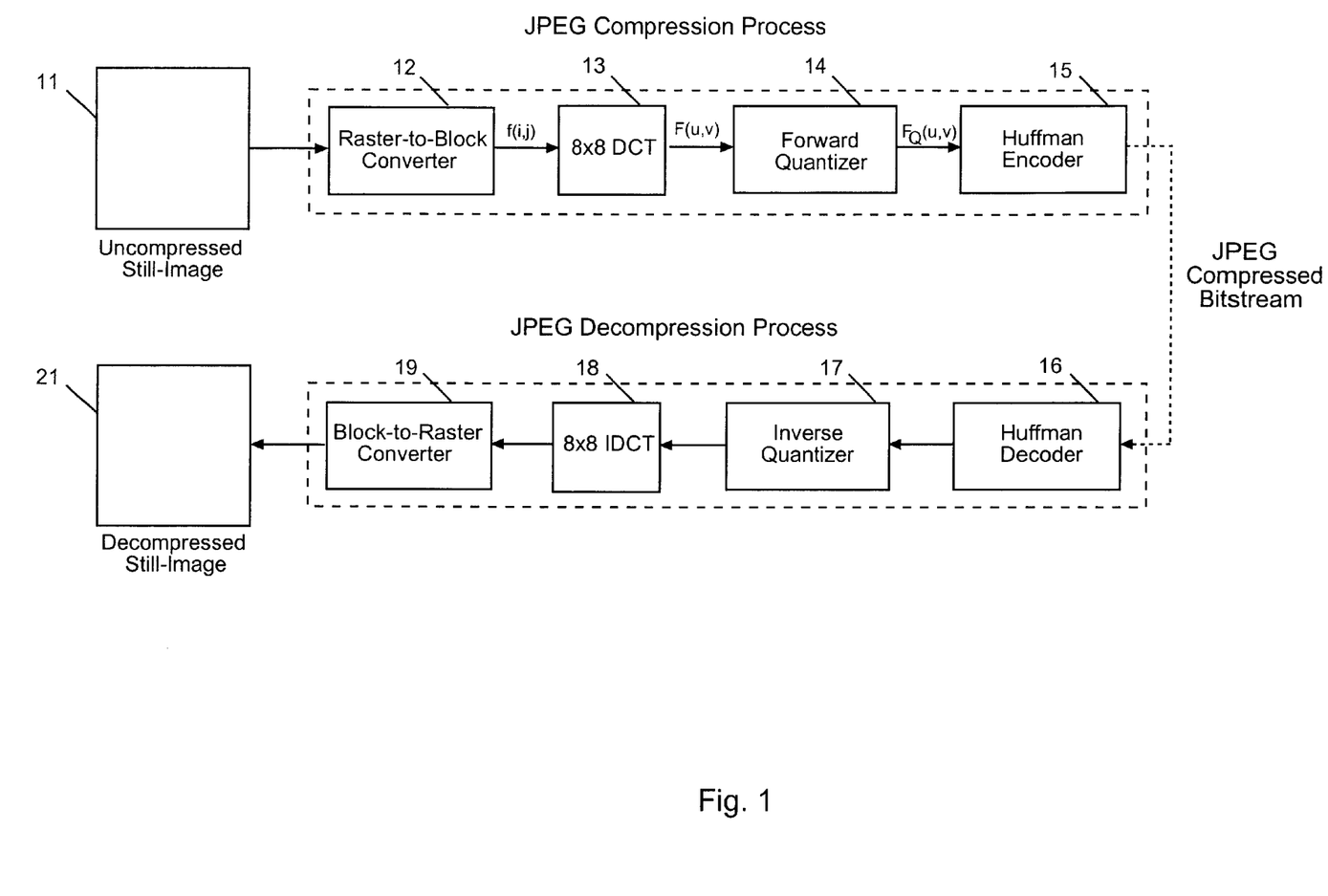
FIG. 1 is a block diagram depicting the JPEG compression and decompression processing flow.

The JPEG compression and decompression process, illustrated schematically in FIG. 1, operates on a block-by-block basis, where each block size is 8×8. As shown schematically in FIG. 1, the uncompressed still-image 11 is decomposed into 8×8 blocks of pixels by a raster-to-block converter 12. These blocks are then transformed by the forward 8×8 DCT 13 to produce a corresponding set of 8×8 DCT blocks. The forward 8×8 DCT F(u,v) of a spatial domain 8×8 block of samples f(i,j) is computed as:

$$F(u, v) = \frac{\alpha_u \alpha_v}{4} \sum_{i=0}^{7} \sum_{j=0}^{7} C_{i,u} C_{j,v} f(i, j), \quad (1)$$

where, $$C_{x,y} = \cos \frac{(2x+1)y\pi}{12}, \quad (2)$$

and, $$\alpha_x = \begin{cases} 1, & x \neq 0 \\ 1/\sqrt{2}, & \text{otherwise.} \end{cases} \quad (3)$$

After output from the forward 8×8 DCT 13, each of the 64 DCT coefficients is uniformly quantized in a forward quantizer 14 in conjunction with a 64-element quantization table Q, which can be derived empirically to discard information which is not visually significant. In this compression process, the only loss incurred during the compression comes from the quantization of F(u,v) to $$F_Q(u, v) = RoundOff\left(\frac{F(u, v)}{Q(u, v)}\right),$$

where Q is the 8×8 quantization table.

After quantization, the DCT data in each block is ordered into a "zigzag" sequence which facilitates entropy coding by placing low frequency coefficients (which are more likely to be non-zero) before the high frequency coefficients (which are more likely to be zero). The data is then Huffman coded in a Huffman encoder 15 to further compact the data and to generate a JPEG compressed bitstream.

The image may be reconstructed from the compressed bitstream using a symmetrical reverse process. The JPEG decompression process begins by decoding the compressed bitstream in a Huffman decoder 16 to regenerate the 8×8 blocks of DCT coefficients. The coefficients are reordered using an inverse zigzaging procedure and the blocks are then fed through an inverse quantizer 17. In the next step, the 8×8 inverse discrete cosine transform (IDCT) 18 operates on the 8×8 blocks of DCT coefficients to generate a stream of 8×8 blocks of pixels. A block-to-raster converter 19 converts these blocks into the decompressed still-image 21. In the decompression process, the IDCT converts the coefficients F(u,v) back to the pixels f(i,j), exactly:

$$f(i, j) = \sum_{u=0}^{7} \sum_{v=0}^{7} \frac{\alpha_u \alpha_v}{4} C_{i,u} C_{j,v} f(u, v). \quad (4)$$

The decompression process will actually work with the quantized coefficients, $F_Q$, and obtain only an approximation $f_Q$ of f.

$$f_Q(i, j) = \sum_{u=0}^{7} \sum_{v=0}^{7} \frac{\alpha_u \alpha_v}{4} C_{i,u} C_{j,v} F_Q(u, v) Q(u, v). \quad (5)$$

Figure 2:
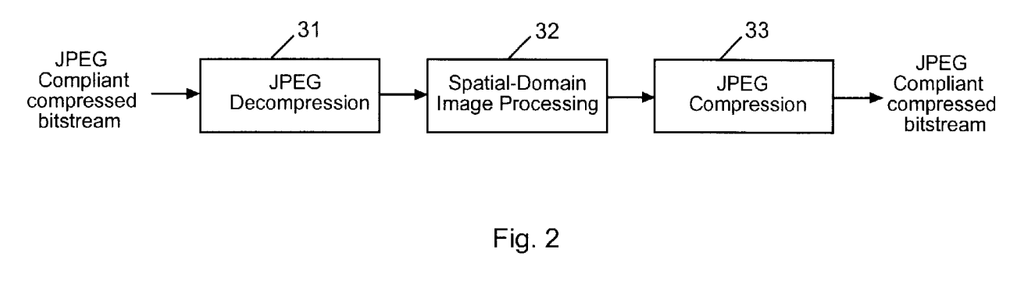
FIG. 2 is a block diagram showing the spatial-domain based image processing for a JPEG data set.

If an image processing function such as rotation or scaling has to be performed on an image that is available only as a JPEG compressed bitstream, this processing could be performed as shown in FIG. 2. First, the JPEG compressed bitstream is decompressed in block 31 back into its spatial domain representation. Spatial domain image processing is then performed in block 32. Afterward, the processed pixel data is recompressed in block 33 to generate a new JPEG compressed bitstream. We refer to this scheme as a spatial-domain approach since the processing is directly applied to the decompressed spatial domain data (pixels).

The spatial-domain approach has certain advantages. One such advantage is that image processing in spatial domain is a well-understood problem and solutions are widely available for many typical image processing functions. Another advantage is that the processing function is independent of the underlying compression scheme used to represent the data.

This approach has certain disadvantages as well. The data has to be fully decompressed prior to applying the image processing function. Moreover, the processed data may have to undergo the compression process again. Since JPEG is a lossy compression method, decompression-recompression may result in a loss of image quality. For the portrait to landscape conversion application, the quality of an image would incrementally deteriorate every time its orientation is changed. Another disadvantage is that the complexity of the decompression and compression process is quite high. If, for instance, in FIG. 2, the image processing task is, say, clockwise rotation by 90°, then the operations count for rotating each 8×8 block of input data is as listed in Table 1. In order to get a rough estimate of the operations count, we have assumed that multiplies, adds and data accesses can each be done at one operation per data item.

TABLE 1

Operations count for spatial-domain based rotate-by-90° operation when the input and output data is in 8 × 8 DCT form. [*] Y. Arai and T. Agui and M. Nakajima, "A Fast DCT-SQ Scheme for Images," Trans. of the IEICE, E 71(11):1095, Nov. 1988.

| Task | Operations Count | Comments |
|---|---|---|
| Huffman Decode | 81 | assume 15% of IDCT's complexity |
| Inverse Quantization | 64 | assume 1 multiply requires 1 operation |
| 8 × 8 IDCT | 544 | 80 multiplies, 464 additions as per [*] |
| Rotate by 90° | 128 | simple matrix transposition (1 read, 1 write per pixel) |
| 8 × 8 DCT | 544 | 80 multiplies, 464 additions as per [*] |
| Forward Quantization | 64 | assume 1 multiply requires 1 operation |
| Huffman Encode | 54 | assume 10% of IDCT's complexity |
| TOTAL | 1415 | |

Figure 3:
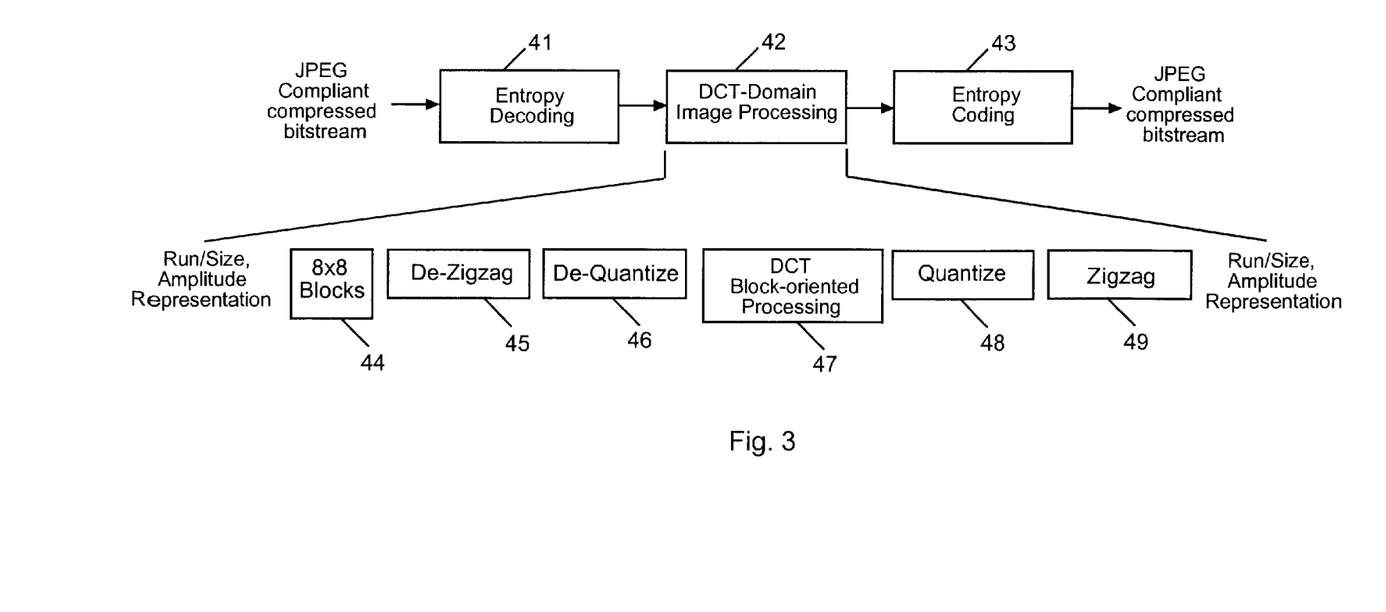
FIG. 3 is a block diagram showing the compressed-domain based image processing for a JPEG data set, in accordance with the invention.

The present invention proposes an alternative to spatial-domain based image processing, namely, compressed domain based image processing. The latter is well suited for data that is already available in compressed form, such as a JPEG bitstream. The basic processing flow for a compressed-domain based image processing scheme is as depicted in FIG. 3. For JPEG data, compressed-domain based image processing usually implies DCT-domain processing which is represented by block 42 in FIG. 3.

As shown in FIG. 3, DCT-domain image processing 42 is preceeded by entropy decoding of the JPEG compressed bitstream in block 41 and followed by entropy coding in block 43. As also shown in FIG. 3, the DCT-domain image processing block 42 is further divided into processing blocks labelled 44–49. As previously noted, decompressing the bitstream yields 8×8 blocks of DCT coefficients 44. The coefficients are reordered using a de-zigzag procedure 45, after which the blocks of DCT coefficients are dequantized 46. In accordance with the invention, the dequantized blocks of DCT coefficients undergo the block-oriented processing 47. Following the processing, the DCT-data based blocks are quantized 48 and reordered into the zigzag sequence 49. However, depending on the image processing task, not all of the blocks 44–49 need to be performed. For instance, for the $D_4$ operations (which can be expressed as sequences of flips about the diagonal and the Y-axis), the de-zigzag 45, de-quantize 46, zigzag 49, and quantize 48 steps can be eliminated. The specifics of compressed domain based $D_4$ operations will be discussed in the next section.

In general, compressed-domain processing has the following advantages. First, image quality could be preserved since in many instances, dequantize-quantize steps can be avoided. Second, the complexity can be much lower than the spatial-domain counterpart depicted in FIG. 2 since full JPEG decompression and compression tasks are avoided. Specifically for the case of rotation by 90°, a simple implementation of the compressed-domain based processing counterpart of Table 1 has an operations count as shown in Table 2. Note that the total operations count using the compressed-domain approach is nearly five times lower than the spatial-domain based approach of Table 1. (Details of the DCT-domain based rotation method are discussed below.) Another advantage is that, in typical digital imagery, due to high correlation among pixels, the DCT-domain representation tends to be quite sparse (e.g., in a 8×8 DCT block, usually there are around 7–16 nonzero values). This data sparseness property can be exploited by the DCT-domain processing approach to further reduce the overall complexity; this property is not available in a spatial-domain representation. (Special techniques to exploit this property for the $D_4$ operations are described below.)

TABLE 2

Operations count for compressed-domain based rotate-by-90° operation when the input and output data is in 8 × 8 DCT form.

| Task | Operations Count | Comments |
|---|---|---|
| Huffman Decode | 81 | assume 15% of IDCT's complexity |
| Inverse Quantization | — | not needed |
| 8 × 8 IDCT | — | not needed |
| Rotate by 90° | 32 112 | need a sign-change every odd column and row-column data interchange |
| 8 × 8 DCT | — | not needed |
| Forward Quantization | — | not needed |
| Huffman Encode | 54 | assume 10% of IDCT's complexity |
| TOTAL | 279 | |

Note that, in general, it may not be possible to derive a compressed-domain based processing equivalent of a spatial-domain based image processing function. DCT is a linear transform and hence, compressed-domain based processing can probably be accomplished for linear image processing functions. Nonlinear image processing functions such as median-filtering, warping/morphing are not amenable to compressed-domain based approaches such as the one depicted in FIG. 3.

DIHEDRAL SYMMETRY OPERATIONS ON JPEG IMAGES

In this section, we develop the basic equations governing simple geometric transformation of JPEG compressed data. The operations defined by compositions of flips about the diagonal axes, the Y-axis (i.e., the middle-vertical axis) and the X-axis (i.e., the middle-horizontal axis) form the group of dihedral symmetry of the square, referred to as $D_4$. These operations are listed and described in Table 3.

TABLE 3

The group $D_4$ of dihedral symmetry of a square.

| Operation | Description | Generation by $F_d$ and $F_y$ |
|---|---|---|
| I | Identity | $F_d F_d$ |
| $F_d$ | Diagonal-flip (flip over main diagonal) | $F_d$ |
| $F_y$ | Column-flip (flip over Y-axis) | $F_y$ |
| $F_{cd}$ | Cross-diagonal-flip (flip over cross-diagonal) | $F_y F_d F_y$ |
| $F_x$ | Row-flip (flip over X-axis) | $F_d F_y F_d$ |
| $R_{90}$ | Rotate 90° clockwise | $F_y F_d$ |
| $R_{180}$ | Rotate 180° | $F_y F_d F_y F_d$ |
| $R_{-90}$ | Rotate 90° counterclockwise | $F_d F_y$ |

Figure 4:
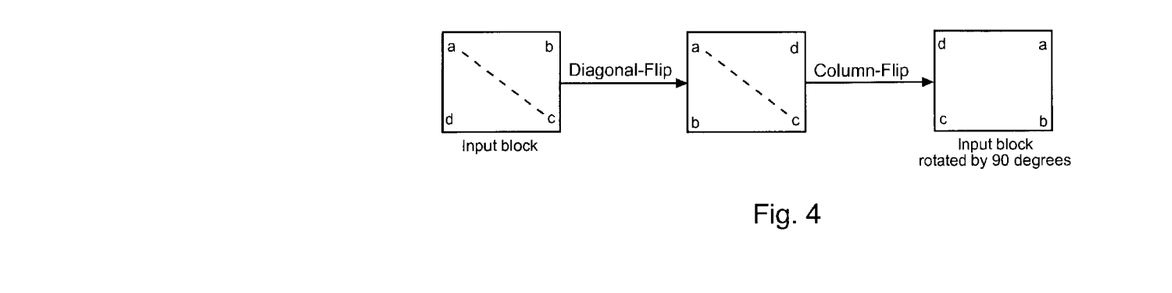
FIG. 4 is a diagram showing a block rotate-by-90° using diagonal-flip ($F_d$) and a column-flip ($F_y$) in accordance with the invention.

Note that the operations $F_d$ and $F_y$ can be composed to generate the whole group. (Notational convention: the composition $o_1 o_2$ of operations $o_1$ and $o_2$ is the operation resulting from first applying $o_2$ and then $o_1$.) For example, a simple clockwise rotate-by-90° ($R_{90}$) can be achieved by applying a diagonal-flip followed by a column-flip as depicted in FIG. 4. Thus, if we can derive the compressed-domain based counterparts of the two operations $F_d$ and $F_y$, all the rest can be derived from them.

Let f be the 8×8 pixel block, and F be the corresponding 8×8 DCT block (DCT(f)=F and IDCT(F)=f). For any of the eight $D_4$ operations, o, it is easy to express the relationship between f and of. The goal is to derive the relationship between F and DCT(of) (denoted by oF).

Consider the operation $F_y$. In spatial domain, the column-flip output $F_y f(i,j)$ can be expressed as:

$$F_y f(i,j) = f(i, 7-j). \qquad (6)$$

From Eq. 1, $F_y F(u,v)$ is:

$$F_y F(u, v) = \frac{\alpha_u \alpha_v}{4} \sum_{i=0}^{7} \sum_{j=0}^{7} C_{i,u} C_{j,v} F_y f(i, j) \qquad (7)$$

$$= \frac{\alpha_u \alpha_v}{4} \sum_{i=0}^{7} \sum_{j=0}^{7} C_{i,u} C_{j,v} f(i, 7-j) \qquad (8)$$

$$= \frac{\alpha_u \alpha_v}{4} \sum_{i=0}^{7} \sum_{k=0}^{7} C_{i,u} C_{7-k,v} f(i, k), \qquad (9)$$

where, k=7−j.

Using Eq. 2, $C_{7-k,v}$ can be expressed as:

$$C_{7-k,v} = \cos\left(\frac{(2(7-k)+1)v\pi}{16}\right) \qquad (10)$$

$$= \cos\left(v\pi - \frac{(2k+1)v\pi}{16}\right) \qquad (11)$$

$$= \cos(v\pi)\cos\left(\frac{(2k+1)v\pi}{16}\right) \qquad (12)$$

$$= (-1)^v \cos\left(\frac{(2k+1)v\pi}{16}\right) \qquad (13)$$

$$= (-1)^v C_{k,v}. \qquad (14)$$

Using Eq. 14 and the DCT definition in Eq. 1, $F_y F(u,v)$ in Eq. 9 can be rewritten as:

$$F_y F(u, v) = \frac{\alpha_u \alpha_v}{4}(-1)^v \sum_{i=0}^{7} \sum_{k=0}^{7} C_{i,u} C_{k,v} f(i, k) \qquad (15)$$

$$= (-1)^v F(u, v). \qquad (16)$$

In spatial-domain, diagonal-flip of an input block f(i,j) is $F_d f(i,j)=f(j,i)$. It can be easily seen that the DCT-domain equivalent of this is:

$$F_d F(u,v) = F(v,u). \qquad (17)$$

Using Eq. 15, Eq. 17, and the relationships given in the third column of Table 3, we can derive the compressed domain counterparts for all the $D_4$ operations. These are listed in Table 4.

TABLE 4

DCT-domain operations for geometric transformations in $D_4$.

| Spatial Domain | DCT-domain | Input block processing |
|---|---|---|
| $I_f(i,j) = f(i,j)$ | $IF(u,v) = F(u,v)$ | None |
| $F_d f(i,j) = f(j,i)$ | $F_d F(u,v) = F(v,u)$ | Transpose |
| $F_y f(i,j) = f(i, 7-j)$ | $F_y F(u,v) = (-1)^v F(u,v)$ | Sign-reverse odd columns |
| $F_{cd} f(i,j) =$ f(7−j,7−i) | $F_{cd} F(u,v) = F_y F_d F_y F(u,v)$ $=(-1)^v F_d F_y F(u,v)$ $=(-1)^v F_y F(v,u)$ $=(-1)^v (-1)^u F(v,u)$ | Transpose and sign-reverse every other element |
| $F_x f(i,j) = f(7-i,j)$ | $F_x F(u,v) = F_d F_y F_d F(u,v)$ $=F_y F(v,u)$ $=(-1)^u F_d F(v,u)$ $=(-1)^u F(u,v)$ | Sign-reverse odd rows |
| $R_{90} f(i,j) = f(7-j,i)$ | $R_{90} F(u,v) = F_y F_d F(u,v)$ $=(-1)^v F_d F(u,v)$ $=(-1)^v F(v,u)$ | Transpose and sign-reverse odd columns |
| $R_{180} f(i,j) =$ f(7−i,7−j) | $R_{180} F(u,v) =$ $F_y F_d F_y F_d F(u,v)$ $=(-1)^v F_y F_d F_y F(u,v)$ $=(-1)^v F_y F(v,u)$ $=(-1)^v (-1)^u F(v,u)$ $=(-1)^v (-1)^u F(u,v)$ | Sign-reverse every other element |
| $R_{90} f(i,j) = f(j,7-i)$ | $R_{-90} F(u,v) = F_d F_y F(u,v)$ $=F_y F(v,u)$ $=(-1)^u F(v,u)$ | Transpose and sign-reverse odd rows |

The above relationships were derived without taking quantization into account. By simply using the dequantized coefficients, $F_Q(u,v)Q(u,v)$, in place of F(u,v), it can be easily seen that the quantized coefficients of a block produced by a $D_4$ operation can be directly obtained by applying the corresponding input block processing (column 3 of Table 4) on the quantized coefficients of the original block. The quantization table remains the same (it is transposed for $F_d$, $F_{cd}$, $R_{90}$, and $R_{-90}$). This DCT-domain approach avoids the IDCT, the DCT, as well as dequantization and quantization. It will be shown below that the de-zigzag and zigzag steps can also be avoided.

In order to perform a $D_4$ operation on an W×H JPEG image consisting of many 8×8 blocks (W and H in any JPEG image are multiples of 8, obtained by padding the original image, if necessary), the compressed-domain based procedure is as follows: (a) reorder the 8×8 DCT blocks for the corresponding geometric transformation, and (b) apply the DCT-domain operation as per Table 4 to elements within each 8×8 DCT block. Note that (a) and (b) are lossless operations in that the quantized DCT coefficients $F_Q(u,v)$ are not manipulated beyond a sign-change; by avoiding the process of dequantization and requantization, no quality loss is incurred regardless of the number of times one or more geometric transformations of Table 4 are applied to the camera JPEG file.

For simplicity, we first describe the implementation techniques using grayscale images; the simple modifications needed for color images are outlined subsequently. We assume that the width and height of the image are multiples of 8. Moreover, for color images, we will assume that subsampling does not necessitate block padding. All the operations described here can also be applied when these constraints are not satisfied, by first padding the original image with some extra rows/columns.

Consider a W×H grayscale image, I, available as JPEG data. By applying entropy-decoding to the JPEG data, and undoing the differential coding for the DC terms, we can obtain the quantized DCT coefficients for each block. Let $F_k$ denote the 8×8 block (numbered k in raster-order) of quantized DCT coefficients for the image ($0 \leq k < WH/64$).

Let $I^o$ denote the result of applying operation o on the image (where o is one of the $D_4$ operations from Table 3). From the preceding discussion, it is apparent that the DCT coefficient blocks of $I^o$ will essentially be the same as those in I, with possible reordering, transposition, and sign changes, and the quantization table will also be the same, with possible transposition. In general, the block $F_k^o$ of quantized coefficients in $I^o$, can be expressed as:

$$F_k^o = oF_{p^o(k)}$$

where $p^o$ is a permutation of the blocks. Consider, as an example, clockwise rotation by 90° ($o=R_{90}$). For $k=i_b(H/8)+j_b$ (that is the block in row $i_b$ and column $j_b$ of blocks, in the rotated image $I^o$), we have, $$p^o(k)=(H-j_b-1)(W/8)+i_b.$$

In order to create the JPEG image $I^o$, we need to calculate the blocks $F_k^o$ in the order, k=0, 1, 2, . . . This would require accessing the blocks of I in the order $p^o(0), p^o(1), p^o(2), \ldots$, which is (in general) different from the raster-order in which these blocks are stored in the JPEG image I. Since the compressed blocks can be of arbitrarily different sizes, extraction of a particular block from the JPEG bitstream would require parsing of all the prior blocks, which is too expensive. Moreover, the value of the quantized DC coefficient in any block can only be extracted after all the previous DC values are decoded, because of differential coding. We avoid these problems by using a two-pass approach. In the first pass, the JPEG image I is parsed to extract the bit-offset for each block and the DC value for each block. In the second pass, when computing $F_o^k$ for the image $I^o$, the block $F_p^o(k)$ is readily accessed by looking up the bit-offset for block number $p^o(k)$ and seeking to that position in the JPEG bitstream for I. This algorithm is summarized in the following pseudo-code.

procedure OperateJPEG
input: JPEG image I, operation o
output: JPEG image $I^o$
/* first pass: gather offsets and DC values */ parse off the header from I
for k=0 to WH/64−1
  1. store the offset into I as the bit-offset for block k
  2. parse I to move past another block while extracting the DC term
  3. undo the differential coding and store the DC value for block k /* second pass: compute and store $I^o$ */ compute and store header for $I^o$, transposing the quantization table of I if required by o
for k=0 to WH/64−1
  1. use the offset and DC tables to seek into I and extract the quantized coefficients of block number $p^o(k)$
  2. transpose and/or apply sign changes to the coefficients, as required by o (Table 4, column 3)
  3. append the entropy-coded coefficients to the JPEG bitstream for $I^o$

EFFICIENT TRANSPOSITION AND SIGN-CHANGING OF BLOCKS

The heart of the "OperateJPEG" algorithm lies in the second pass, when the original block $F_{p^o(k)}$ is transformed via o to get the block $F_k^o$ for the image $I^o$. Transposing and applying sign-changes to an 8×8 block would require accessing each element of the block once, if implemented in a straight-forward manner. That is, the complexity will be a multiple of 64. The quantized coefficient blocks in typical JPEG image have a very small number (typically less than 16) of non-zero coefficients. We now present an algorithm to do the transposition and sign-changes with a complexity proportional to the number of non-zero coefficients in the block. This results in a substantial decrease in the overall complexity, making it linear in the total size of the compressed image, rather than in the total size of the uncompressed image.

In the Huffman coding mode of JPEG a block of quantized coefficients is coded by scanning it in zigzag order to group together long runs of zeros. The zigzag ordering is specified in Table 5. When coding a block, first the difference between the quantized DC value of the current block and the previous block is coded, using a Huffman table specific for these differentials.

TABLE 5

The zigzag ordering, ZZ(u,v), used by JPEG.

| | 0 | | | v → | | | | 7 |
|---|---|---|---|---|---|---|---|---|
| 0 | 0 | 1 | 5 | 6 | 14 | 15 | 27 | 28 |
| | 2 | 4 | 7 | 13 | 16 | 26 | 29 | 42 |
| | 3 | 8 | 12 | 17 | 25 | 30 | 41 | 43 |
| | 9 | 11 | 18 | 24 | 31 | 40 | 44 | 53 |
| u ↓ | 10 | 19 | 23 | 32 | 39 | 45 | 52 | 54 |
| | 20 | 22 | 33 | 38 | 46 | 51 | 55 | 60 |
| | 21 | 34 | 37 | 47 | 50 | 56 | 59 | 61 |
| 7 | 35 | 36 | 48 | 49 | 57 | 58 | 62 | 63 |

Next, the quantized AC coefficients are scanned in zigzag order and coded as a sequence of symbol trios of the form (R, S, V), where R is the number of consecutive zeros in the zigzag ordering, and the next non-zero coefficient has the value x such that:

$$S = \lceil \log_2(|x|+1) \rceil,$$

$$V = S \text{ least significant bits of } \begin{cases} x & \text{when } x > 0 \\ x-1 & \text{when } x < 0. \end{cases}$$

The bits for V are extracted using the standard 2's complement binary representation of x or x−1. In the JPEG bitstream, each (R, S, V) is coded using first a Huffman table to encode (R, S) and then S extra bits to encode V There are some special coding situations such as very long runs of zeros and end-of-block, handled by special codes. But for our purposes, it should be clear from this description that the JPEG data can be easily parsed to capture each block in a data structure of the form:

```
struct JpegBlock {
        int D; /* the quantized DC coefficient */
        int N; /* number of non-zero AC coefficients */
        struct {
                int Z; /* the zigzag index */
                int S;
                int V;
        } A[63];
};
```

In this data structure, N is the number of non-zero AC coefficients in the block. Only the first N entries of the array A are meaningful. The element A[k] gives the zig-zag location (Z), and the S and V values for the $k^{th}$ non-zero AC coefficient, $0 \leq k < N$. Reading a block from a JPEG bitstream into this structure, and writing this structure as JPEG data, are both straightforward, and the details are omitted here.

The operation o may require transposition and/or sign changes. We now describe a novel algorithm for implementing o, using the above data structure, such that only N steps are needed (rather than 64). This algorithm avoids de-zigzagging and zigzagging of the coefficients, as it uses the zigzag-ordered block representation directly.

Given an input "JpegBlock" structure B (corresponding to a block F), we would like to find the structure $B^o$, corresponding to oF. For changing the sign of a non-zero quantized AC coefficient, x, with the corresponding S and V values being $S_x$ and $V_x$, it is sufficient simply to take the bitwise complement of $V_x$. That is, $$S_{-x} = S_x, V_{-x} = -V_x.$$

Let $s^o[64]$ be a precomputed array of boolean flags such that $s^o[Z]$ is TRUE if and only if o requires the sign of the $Z^{th}$ zigzag coefficient to be changed. If only sign-changes are needed (i.e., for the operations $F_x$, $F_y$, $R_{180}$), then, B can be converted into $B^o$ by copying each entry, while flipping the bits for those A[k]. V for which $s^o[A[k].Z]$ is TRUE.

Transposing a "JpegBlock" structure in N steps uses the following key observation: the array A remains the same, except that elements on any given cross-diagonal are reversed in order. To illustrate this, let t[Z] denote the transposed zigzag index for the original zigzag index Z. That is, $$t[1]=2, t[2]=1, t[3]=5, t[4]=4, \ldots$$

Consider a situation when the zigzag coefficients numbered:

1, 3, 6, 7, 10, 11, 14 are the only non-zero coefficients. Then, the zigzag ordering after transposition will be:

t[1], t[3], t[7], t[6], t[4], t[10].

Thus, each group of coefficients lying on the same cross-diagonal needs to be reversed. This can be done efficiently by scanning the array B.A[ . . . ] of non-zero coefficients, pausing at each coefficient where the cross-diagonal changes to copy the previous cross-diagonal from B.A[ . . . ] to $B^o$.A[ . . . ] in reverse order.

The following piece of pseudo-code summarizes the algorithm. The arrays t and $s^o$ (defined previously) are precomputed. In addition, let d[64] be another precomputed array, giving the "cross-diagonal number" for each zigzag index. That is, if the zig-zag index Z corresponds to row number u and column number v, then, d[Z]=u+v.

procedure TransposeAndSignChange
  input: JpegBlock B, arrays t, $s^o$, d
  output: JpegBlock $B^o$

```
B°.D = B.D /* note that s°[0] is always FALSE */
B°.N = B.N
if (B.N == 0) then return
dcur = d[B.A[0].Z] /* the starting cross-diagonal number */
startpos = 0 /* where cross-diagonal number dcur begins in B.A[ . . . ] */
for k = 0 to B.N
    /* find the new cross-diagonal number */
    if (k < B.N) then dnew = d[B.A[k].Z]
    else dnew = ∞ /* any value > 14, just to ensure that dnew > dcur */
    if (dnew > dcur) then
        /* copy B.A[startpos . . . (k − 1)] into B°.A[ . . . ] in reverse order */
        for l = 0 to k − startpos − 1
            i = k − 1 − l /* index in B.A[ . . . ] */
            j = startpos + l /* index in B°.A[ . . . ] */
            B°.A[j].Z = t[B.A[i].Z]
            B°.A[j].S = B.A[i].S
            B°.A[j].V = B.A[i].V
            if (s°[B°.A[j].Z]) then
                B°.A[j].V = ¬B°.A[j].V /* flip the bits */
        /* update dcur and startpos */
        dcur = dnew
        startpos = k
```

Color images

In general, a JPEG image I consists of more than one color plane, with some planes subsampled. Let the number of color planes be denoted by P. Associated with each plane, p ($1 \leq p \leq P$), there is a horizontal sampling factor, $w_p$, and a vertical sampling factor, $h_p$. The width and height of plane number p are given by $W w_p/w_{max}$ and $H h_p/h_{max}$, respectively. Here, $w_{max}$ is the maximum value of $w_p$, and $h_{max}$ is the maximum value of $h_p$, over all planes ($1 \leq p \leq P$).

The JPEG data can have a further layer of structuring, consisting of scans. A scan consists of one or more color planes, with possibly a limited bit-precision of coefficient values. The "OperateJPEG" algorithm can be extended simply by applying it to each scan in succession.

Within each scan, the data from the blocks of all the color planes in the scan is organized into units known as minimum coded units (MCUs). Each MCU consists of a fixed number of blocks in a fixed order, determined by all the $w_p$ and $h_p$. For the operations we are considering, the image $I^o$ consists of exactly the same scans and MCU groupings as I, as long as we do not change the sampling factors ($h_p$ and $w_p$ do need to be swapped for the operations requiring transposition). The order of the MCUs and the order of blocks within each MCU might change, but each MCU in $I^o$ can be obtained from exactly one MCU in I. We exploit this fact to also save some memory by building the bit-offset and DC tables at MCU level, rather than block level.

Thus, for every scan in I, "OperateJPEG" works in two passes. In the first pass, for each MCU in the scan, the bit-offset is recorded, and the DC value of the first block in that MCU from each color plane is recorded. In the second pass, when a particular MCU for the scan of $I^o$ is to be computed, the corresponding MCU of I is extracted and the "JpegBlock" structure for each constituent block is filled out. These blocks are then transposed/sign-changed/reordered (as required by the operation) to form the MCU for $I^o$ which is written out as JPEG data.

COMPRESSED DOMAIN BASED IMAGE ROTATIONS—DSC APPLICATION

Figure 5:
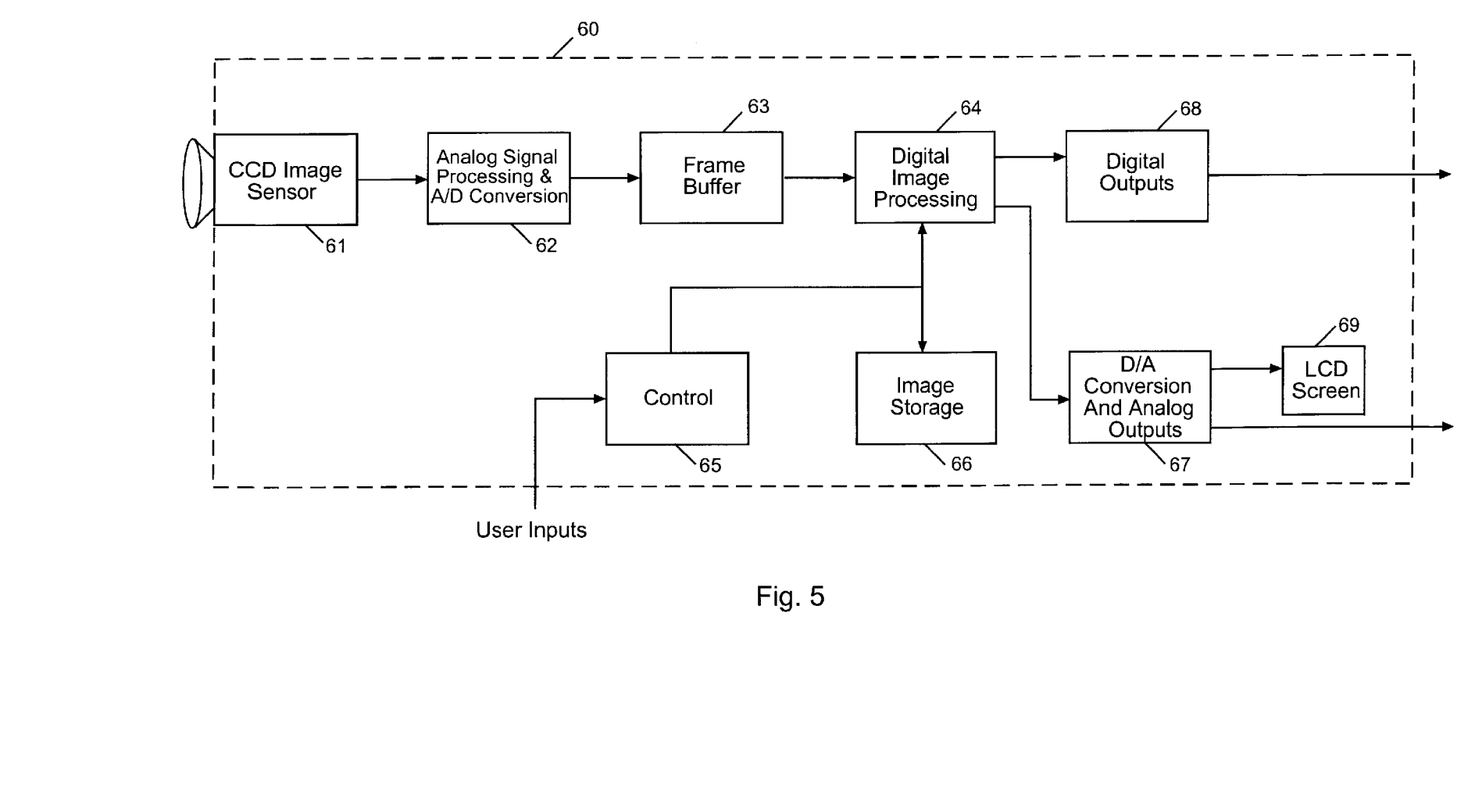
FIG. 5 is a block diagram of a digital still-image camera (DSC) which may be used in connection with the invention.

The compressed-domain processing techniques of the present invention may be employed in connection with various digital devices including a digital still-image camera (DSC), a block diagram of which is illustrated in FIG. 5. Operating under microprocessor control, the DSC 60 has a charge-coupled device (CCD) image sensor that captures an image and converts it to an analog electrical signal in block 61. The analog signal is then processed and digitized in block 62, after which the digital image is temporarily stored in a frame buffer 63 while it undergoes digital processing in block 64. The digital image processing block 64 performs several functions including compression and decompression and may also perform the compressed-domain based processing techniques of the present invention. Under user control 65, the processing block 64 interfaces with in-camera image storage 66 where decompressed image data may be stored. The storage block 66 may comprise compact magnetic or solid-state storage media, either removable or fixed within the DSC 60, and may include removable, large-capacity PCMCIA-format hard disk cards or flash memory cards.

The DSC 60 includes analog and digital outputs, 67 and 68 respectively, through which image data may be transmitted within the DSC or to external devices. Uncompressed image data may be transmitted, via the analog outputs 67, to an LCD screen 69 within the DSC 60, or to external devices such as a VCR or TV monitor. Image data, whether compressed or uncompressed, may also be transmitted through the digital outputs 68 to a digital device such as a computer system where the image could be displayed.

The ability to perform the $D_4$ operations such as rotation by 90°, 180°, 270° or mirror-flip by directly manipulating the DCT-domain representations is quite useful in the DSC 60. When a camera is held vertically to capture a tall object, the resulting image appears as an image that has undergone a 90° rotation with respect to the same picture taken with the camera held horizontally. With typical film cameras this is not a problem, since when holding the prints, one simply rotates the picture by 90° to view the correct image. With DSCs 60 pictures taken in the manner described above can be problematic since often these images are directly printed or viewed on a TV monitor or incorporated in a computer document. By incorporating compressed-domain based image processing, during readout of the DSC image file, the DSC 60 can produce the corrected view of the image by undoing the rotation as per the methods described herein. In a DSC system, the rotation function can be within the DSC 60 or within the software driver running on a computer which is connected to the DSC 60. For a DSC 60 having limited computing capabilities and limited memory, a compressed-domain based approach might be the only efficient way in which to perform the geometric transformation. The alternative approach of decompressing the data and then performing the manipulation is memory intensive and the slower CPU speed in the DSC 60 can lead to significant performance penalties. As DSC systems evolve, additional features such as image enhancement and watermarking can be easily incorporated within the compressed domain processing framework without having to go back-and-forth between a compressed domain representation and spatial-domain representation.

Figure 6:
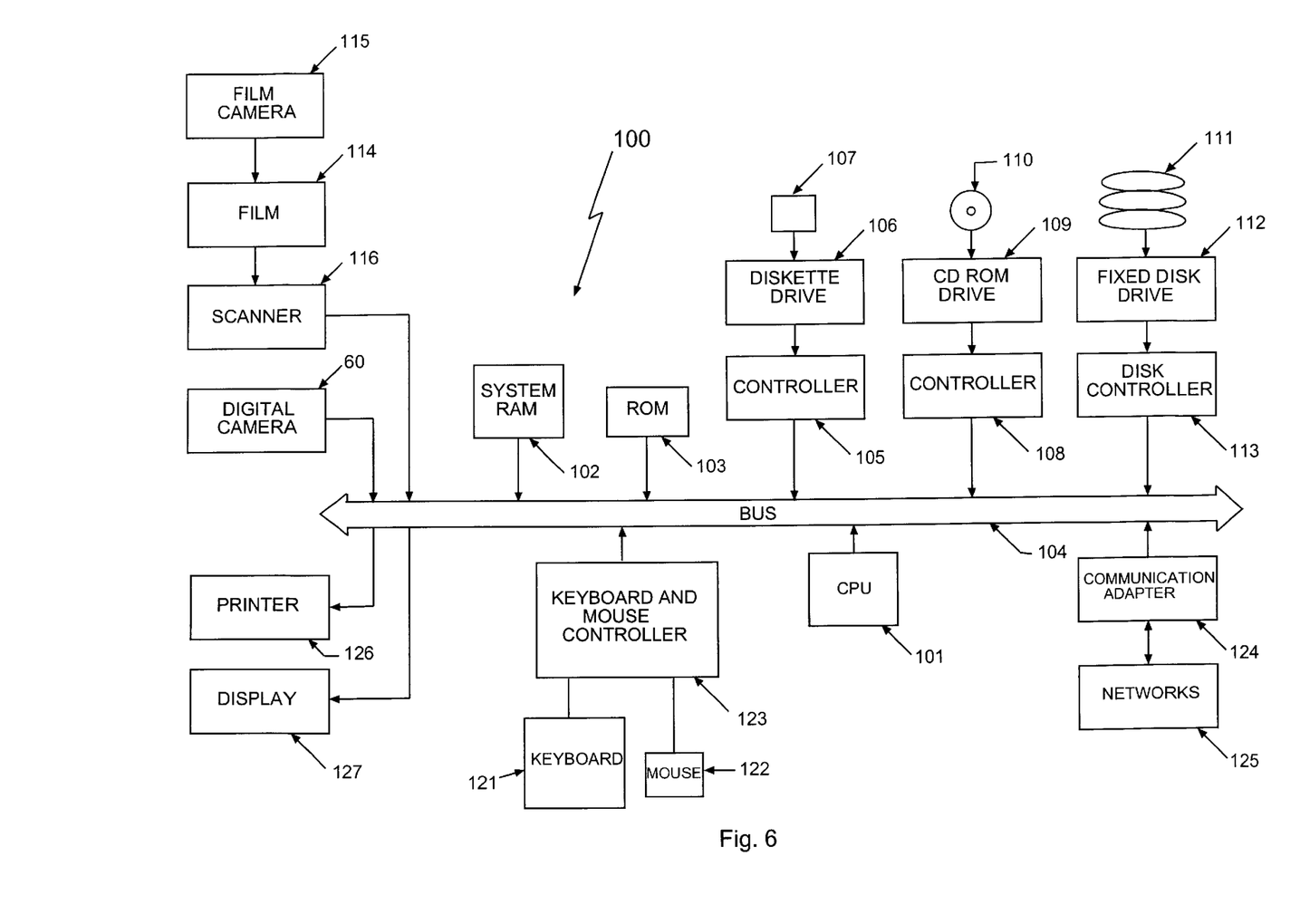
FIG. 6 is a block diagram that illustrates the interrelationship between various components that may be used in capturing and viewing digital images, as well as processing such images in accordance with the invention.

As noted above, the DSC 60 shown in FIG. 5 can also be used in connection with a computer system and other components in capturing, processing and viewing digital images. FIG. 6 is a block diagram that illustrates the interrelationship between the DSC 60, a computer system and various other components. The computer system, identified generally by reference numeral 100, may be of any suitable type such as a main frame or personal computer.

Computer system 100 comprises a central processing unit (CPU) 101 which may be a conventional microprocessor, a random access memory (RAM) 102 for temporary storage of information, and a read only memory (ROM) 103 for permanent storage of information. Each of these components is coupled to a bus 104. Operation of the computer system 100 is typically controlled and coordinated by operating system software. The operating system, which is embodied in the system memory and runs on CPU 101, coordinates the operation of computer system 100 by controlling allocation of system resources and performing a variety of tasks, such as processing, memory management, networking and I/O functions, among others.

Also coupled to bus 104 by a controller 105 is a diskette drive 106 into which a non-volatile mass storage device such as a diskette 107 may be inserted. Similarly, a controller 108 interfaces between bus 104 and a compact disc (CD) ROM drive 109 which is adapted to receive a CD ROM 110. A hard disk 111 is provided as part of a fixed disk drive 112 which is coupled to bus 104 by a disk controller 113.

Software for the compressed-domain based processing techniques may be stored on storage devices 107 and 110 and transferred to CPU 101 for execution. Alternatively, the software may be stored in RAM 102 or ROM 103. Similarly, image data processed or to be processed in accordance with the invention may be loaded into and extracted from computer system 100 using removable storage media devices such as the diskette 107 and CD ROM 110.

Image data may be input into computer system 100 in other ways as well. Film-based images 114 generated by a film camera 115 can be digitized by a scanner 116 for storage and processing by the computer 100. The DSC 60 can directly digitize images and transmit them to the computer 100, as previously explained. A keyboard 121 and mouse 122, which are coupled to bus 104 via a controller 123, facilitate the input of such data and otherwise provide a means for entering information into computer system 100.

Image data may also be transferred to and from computer 100 for remote locations. To this end, computer 100 may also include a communications adapter 124 which enables the computer 100 to communicate with networks 125, which may include local area networks (LANs), the internet or online services, via direct connections or via modem.

Digital images transmitted or stored in computer 100 may be viewed in a number of different ways. A printer 126 attached to computer 100 can produce color prints that vary in quality depending on the printer 126. Another option is to view the images on a display 127 associated with the computer 100. Yet another choice is to display the images on a television receiver using a VCR.

As the foregoing description demonstrates, the inventors herein have developed a simple compressed-domain based processing framework for JPEG compressed still imagery. It has been shown that simple geometric transformations such as mirror image, rotations by 90°, 180° and 270° can be easily performed in the DCT domain without any loss of image fidelity. Furthermore, it was also shown that even a simple transformation such as rotate-by-90° can achieve significant speedup when performed in DCT domain instead of the conventional spatial-domain based processing approach. The practical use of the compressed-domain based image transformations in a real-world setting, namely a digital still-camera has also been described. Since images captured by a digital camera are quite noisy to begin with, it is imperative that any image processing applied to these images should not increase the noise and the methods developed in this report are essentially lossless operations. Furthermore, these methods are well suited to the limited computing and memory capabilities found in consumer digital still cameras. The basic compressed domain framework can be used for other types of image transformations; specifically, the methodology developed here can be extended to image enhancement, image filtering (see, B. Chitprasert and K. R. Rao, "Discrete Cosine Transform Filtering," *Signal Processing*, vol 19, pp. 233–245, 1990), resolution translation, etc.

While the invention has been described in conjunction with specific embodiments, it will be evident to those skilled in the art in light of the foregoing description that many further alternatives, modifications and variations are possible. For example, the block diagrams used to illustrate the compressed-domain based processing techniques of the present invention, show the performance of certain specified functions and relationships thereof. The boundaries of these functional blocks have been arbitrarily defined herein for the convenience of description. Alternate boundaries may be defined so long as the specified functions and relationships thereof are appropriately formed. Moreover, the psuedocode used to illustrate the algorithms of the present invention does not depict syntax or any particular programming language. Rather, it provides the functional information one skilled in the art would require to fabricate circuits or to generate software to perform the processing required. Each of the functions depicted in the block diagrams may be implemented, for example, by software instructions, a functionally equivalent circuit such as a digital signal processor circuit, an application specific integrated circuit (ASIC) or combination thereof. The present invention, having been thus described, is intended to embrace all such alternatives, modifications, applications and variations as may fall within the spirit and scope of the appended claims.

What is claimed is:

1. A method for performing a dihedral symmetry operation on a spatial domain representation of a digital image by manipulating a linear transform domain representation of the digital image, said method comprising the steps of:

parsing compressed image data of the digital image to extract an offset value and a DC value for each of a plurality of linear-transform-based coded data blocks, wherein elements of the data blocks were previously coded as a sequence of symbol trios so that the steps of said method are performed without de-zigzagging and zigzagging the elements of each data block;

accessing each of the plurality of linear-transform-based coded data blocks by using the corresponding offset value;

extracting a sequence of non-zero elements from each of the plurality of linear-transform-based coded data blocks;

transposing the sequence of non-zero elements within each data block without expanding into a full data block; and coding the transposed sequence of non-zero elements of each data block;

wherein the spatial domain representation of the digital image undergoes a dihedral symmetry operation.

2. The method as recited in claim 1, wherein the step of transposing the sequence of non-zero elements within each of the data blocks further comprises the steps of:

sequentially examining the sequence of non-zero elements of each of the plurality of data blocks;

determining the non-zero elements that are positioned within a same one of a plurality of cross-diagonals of each data block; and reversing the order of non-zero elements positioned within the same cross-diagonal.

3. The method as recited in claim 1, wherein the dihedral symmetry operation comprises flipping the digital image over its main diagonal.

4. The method as recited in claim 1, further comprising the step of applying sign-changes to the sequence of non-zero elements within each data block wherein the dihedral symmetry operation comprises flipping the digital image over its main cross-diagonal axis.

5. The method as recited in claim 1, further comprising the step of applying sign-changes to the sequence of non-zero elements within each data block wherein the dihedral symmetry operation comprises rotating the digital image 90° clockwise.

6. The method as recited in claim 1, further comprising the step of applying sign-changes to the sequence of non-zero elements within each data block wherein the dihedral symmetry operation comprises rotating the digital image 90° counterclockwise.

7. The method as recited in claim 4, wherein, after transposing the sequence of non-zero elements within each data block, sign-reversing every other non-zero element within each data block without expanding into a full data block.

8. The method as recited in claim 5, wherein, after transposing the sequence of non-zero elements within each data block, sign-reversing the odd-column non-zero elements within each data block without expanding into a full data block.

9. The method as recited in claim 6, wherein, after transposing the sequence of non-zero elements within each data block, sign-reversing the odd-row non-zero elements within each data block without expanding into a full data block.

10. A digital camera, comprising:

a sensor for capturing light and converting the light into an analog image signal;

an analog-to-digital converter for converting the analog image signal to a digital image in spatial domain; and a digital image processor for compressing the digital image from a spatial domain representation of the digital image to a linear transform domain representation of the digital image defined by a plurality of linear-transform-based coded data blocks, wherein elements of the data blocks are coded as a sequence of symbol trios during the compressing, wherein said digital image processor parses compressed image data of the digital image to extract an offset value and a DC value for each of the plurality of linear-transform-based coded data blocks, accesses each of the plurality of linear-transform-based coded data blocks by using the corresponding offset value, extracts a sequence of non-zero elements of each of the plurality of linear-transform-based coded data blocks, transposes the sequence of non-zero elements within each data block without expanding into a full data block, applies sign change to non-zero elements within each data block and codes the sequence of non-zero elements of each data block, without de-zigzagging and zigzagging the elements of each data block, to perform a dihedral symmetry operation on the spatial domain representation of the digital image.

11. The digital camera as recited in claim 10, wherein the dihedral symmetry operation comprises rotating the digital image 90° clockwise.

12. The digital camera as recited in claim 10, wherein the dihedral symmetry operation comprises flipping the digital image over its main cross diagonal.

13. The digital camera as recited in claim 10, wherein the dihedral symmetry operation comprises rotating the digital image 90° counterclockwise.

14. The digital camera as recited in claim 11, wherein, after said digital image processor transposes the sequence of non-zero elements within each data block, said digital image processor sign-reverses the odd-column non-zero elements within each data block without expanding into a full data block.

15. The digital camera as recited in claim 12, wherein, after said digital image processor transposes the sequence of non-zero elements within each data block, said digital image processor sign-reverses every other non-zero element within each data block without expanding into a full data block.

16. The digital camera as recited in claim 13, wherein, after said digital image processor transposes the sequence of non-zero elements within each data block, said digital image processor sign-reverses the odd-row non-zero elements within each data block without expanding into a full data block.

17. A computer system having a computer-readable program code embodied therein for causing the computer system to geometrically transform a digital image in spatial domain by performing the steps of:

processing the digital image to obtain a linear transform domain representation of the digital image defined by a plurality of linear-transform-based coded data blocks, wherein elements of the data blocks are coded as a sequence of symbol trios so that the steps are performed without de-zigzagging and zigzagging the elements of each data block;

parsing the compressed image data to extract an offset value and a DC value for each of the plurality of linear-transform-based coded data blocks;

accessing each of the plurality of linear-transform-based coded data blocks by using the corresponding offset value;

extracting a sequence of non-zero elements from each of the plurality of linear-transform-based coded data blocks;

transposing the sequence of non-zero elements within each data block without expanding into a full data block; and coding the transposed sequence of non-zero elements of each data block;

wherein the spatial domain representation of the digital image undergoes a dihedral symmetry operation.

18. The computer system as recited in claim 17, wherein the step of transposing the sequence of non-zero elements within each of the data blocks further comprises the steps of:

sequentially examining the sequence of non-zero elements of each of the plurality of data blocks;

determining the non-zero elements that are positioned within a same one of a plurality of cross-diagonals of each data block; and reversing the order of non-zero elements positioned within the same cross-diagonal.

19. The computer system as recited in claim 17, wherein the dihedral symmetry operation comprises flipping the digital image over its main diagonal.

20. The computer system as recited in claim 17, further comprising the step of applying a sign change to non-zero elements wherein the dihedral symmetry operation comprises rotating the digital image over its main cross-diagonal axis.

21. The computer system as recited in claim 17, further comprising the step of applying a sign change to non-zero elements wherein the dihedral symmetry operation comprises rotating the digital image 90° clockwise.

22. The computer system as recited in claim 17, further comprising the step of applying a sign change to non-zero elements wherein the dihedral symmetry operation comprises rotating the digital image 90° counterclockwise.

23. The computer system as recited in claim 20, wherein, after transposing the sequence of non-zero elements within each data block, sign-reversing every other non-zero element within each data block without expanding into a full data block.

24. The computer system as recited in claim 21, wherein, after transposing the sequence of non-zero elements within each data block, sign-reversing the odd-column non-zero elements within each data block without expanding into a full data block.

25. The computer system as recited in claim 22, wherein, after transposing the sequence of non-zero elements within each data block, sign-reversing the odd-row non-zero elements within each data block without expanding into a full data block.

26. A method for performing a dihedral symmetry operation on a spatial domain representation of a digital image by manipulating a linear transform domain representation of the digital image, said method comprising the steps of:

parsing compressed image data of the digital image to extract an offset value and a DC value for each of a plurality of linear-transform-based coded data blocks, wherein elements of the data block were previously coded as a sequence of symbol trios so that the steps of said method are performed without de-zigzagging and zigzagging the elements of each data block;

accessing each of the plurality of linear-transform-based coded data blocks by using the corresponding offset value;

extracting a sequence of non-zero elements from each of the plurality of linear-transform-based coded data blocks;

applying sign-changes to the sequence of non-zero elements within each data block without expanding into a full data block; and coding the resulting sequence of non-zero elements of each data block;

wherein the spatial domain representation of the digital image undergoes a dihedral symmetry operation.

27. The method as recited in claim 26, wherein the dihedral symmetry operation comprises rotating the digital image over its middle-horizontal axis.

28. The method as recited in claim 26, wherein the dihedral symmetry operation comprises rotating the digital image over its middle-vertical axis.

29. The method as recited in claim 26, wherein the dihedral symmetry operation comprises rotating the digital image 180°.

30. The method as recited in claim 27, wherein the step of applying sign-changes is applied to sign-reverse the odd-column elements within each data block without expanding into a full data block.

31. The method as recited in claim 28, wherein the step of applying sign-changes is applied to sign-reverse the odd-row elements within each data block without expanding into a full data block.

32. The method as recited in claim 29, wherein the step of applying sign-changes is applied to sign-reverse every other element within each data block without expanding into a full data block.

33. The method as recited in claim 1, wherein the symbol trio comprises first, second and third symbols, the first symbol representing the number of consecutive zeros in a zigzag ordering of the corresponding data block, and the next non-zero element has a value x such that:

$$S=\lceil \log_2(|x|+1)\rceil,$$

$$V = S \text{ least significant bits of } \begin{cases} x & \text{when } x > 0 \\ x-1 & \text{when } x < 0. \end{cases}$$

wherein S represents the second symbol and V represents the third symbol.

34. The digital camera as recited in claim 10, wherein the symbol trio comprises first, second and third symbols, the first symbol representing the number of consecutive zeros in a zigzag ordering of the corresponding data block, and the next non-zero element has a value x such that:

$$S=\lceil \log_2(|x|+1)\rceil,$$

$$V = S \text{ least significant bits of } \begin{cases} x & \text{when } x > 0 \\ x-1 & \text{when } x < 0. \end{cases}$$

wherein S represents the second symbol and V represents the third symbol.

35. The computer system as recited in claim 17, wherein the symbol trio comprises first, second and third symbols, the first symbol representing the number of consecutive zeros in a zigzag ordering of the corresponding data block, and the next non-zero element has a value x such that:

$$S=\lceil \log_2(|x|+1)\rceil,$$

$$V = S \text{ least significant bits of } \begin{cases} x & \text{when } x > 0 \\ x-1 & \text{when } x < 0. \end{cases}$$

wherein S represents the second symbol and V represents the third symbol.

36. The method as recited in claim 26, wherein the symbol trio comprises first, second and third symbols, the first symbol representing the number of consecutive zeros in a zigzag ordering of the corresponding data block, and the next non-zero element has a value x such that:

$$S=\lceil \log_2(|x|+1)\rceil,$$

$$V = S \text{ least significant bits of } \begin{cases} x & \text{when } x > 0 \\ x-1 & \text{when } x < 0. \end{cases}$$

wherein S represents the second symbol and V represents the third symbol.

* * * * *